(12) United States Patent
Liu et al.

(10) Patent No.: US 7,879,295 B2
(45) Date of Patent: *Feb. 1, 2011

(54) CONVERSION SYSTEM FOR REDUCING $NO_x$ EMISSIONS

(75) Inventors: Ke Liu, Rancho Santa Margarita, CA (US); Arnaldo Frydman, Santa Ana, CA (US); Vladimir Zamansky, Oceanside, CA (US); Teresa Grocela Rocha, Clifton Park, NY (US); Jonathan Lloyd Male, Schoharie, NY (US); Harish Radhakrishna Acharya, Clifton Park, NY (US); Roy James Primus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1339 days.

This patent is subject to a terminal disclaimer.

(21) Appl. No.: 11/172,288

(22) Filed: Jun. 30, 2005

(65) Prior Publication Data

US 2007/0000243 A1    Jan. 4, 2007

(51) Int. Cl.
*F01N 3/10* (2006.01)
*B01D 50/00* (2006.01)

(52) U.S. Cl. .................................. 422/170; 60/299

(58) Field of Classification Search ............... 422/177, 422/180; 60/274, 286, 303; 208/208 R, 208/246–249
See application file for complete search history.

(56) References Cited

U.S. PATENT DOCUMENTS

| 4,976,846 | A | | 12/1990 | Long et al. |
| 5,771,684 | A | * | 6/1998 | Hertl et al. ............... 60/274 |
| 6,329,434 | B1 | | 12/2001 | Wen et al. |
| 6,447,745 | B1 | | 9/2002 | Feeley et al. |
| 6,739,125 | B1 | * | 5/2004 | Mulligan ................ 60/286 |
| 2004/0200758 | A1 | * | 10/2004 | Yang et al. ........... 208/208 R |

FOREIGN PATENT DOCUMENTS

| DE | 4404617 | 2/1994 |
| JP | 06212952 | 2/1994 |
| JP | 09280037 | 12/1997 |
| JP | 10212932 | 11/1998 |
| WO | WO01/34950 | 5/2001 |

OTHER PUBLICATIONS

"Catalytic Cracking of n-Dodecane and Diesel Fuel to Improve the Selective Catalytic Reduction of $No_x$ Automotive Exhaust Containing Excess Oxygen", S. Kurze et al., Chem. Eng. Technol. 22 (1999) 855-858.
PCT Search Report—Dec. 13, 2006.
Zhu et al., "Catalytic Partial Oxidation of Gasoline to Syngas in a Dense Membrane Reactor", Elsevier, Catalysis Today, vol. 93-95 pp. 257-261, 2004.
Christopher L. Marshall, "Bifunctional Catalysts for the Selective Catalytic Reduction of NO by Hydrocarbons", Argonne national Laboratory, Presented to the 10th diesel Engine Emission Reduction (DEER) Conference (http://www.orau.gov/DEER/), Aug. 31, 2004.

* cited by examiner

*Primary Examiner*—Tom Duong
(74) *Attorney, Agent, or Firm*—Paul J. DiConza (57) ABSTRACT

Disclosed herein is a system for reducing $NO_x$ emissions comprising a fuel tank in fluid communication with a fuel converter, wherein the fuel converter is located down stream of the fuel tank and wherein the fuel converter comprises a catalyst composition that is operative to continuously convert heavy hydrocarbon molecules having 9 or more carbon atoms per molecule into light hydrocarbon molecules having 8 or less carbon atoms per molecule; a selective catalytic reduction catalyst reactor in fluid communication with the fuel converter and located downstream of the fuel converter; and an engine in fluid communication with the fuel tank and the selective catalytic reduction catalyst reactor, wherein the engine is located downstream of the fuel tank and upstream of the selective catalytic reduction catalyst reactor.

22 Claims, 3 Drawing Sheets

CONVERSION SYSTEM FOR REDUCING $NO_x$ EMISSIONS

BACKGROUND

This disclosure relates to a conversion system for reducing NOx emissions in locomotives and vehicles that employ hydrocarbon-based fossil fuels.

Production of emissions from mobile and stationary combustion sources such as locomotives, vehicles, power plants and the like, has resulted in environmental pollution. One particular source of such emissions is $NO_x$ emissions from vehicles. Environmental legislation restricts the amount of $NO_x$ that can be emitted by vehicles. In order to comply with this legislation, efforts have been directed at reducing the amount of $NO_x$ emissions.

One method of emission reduction is directed to minimizing the amount of $NO_x$ emissions produced during the process of combustion in engines. This method generally involves redesigning engines to optimize the combustion of fuel. This approach has resulted in the reduction of $NO_x$ over the years; however, it is expensive and all efforts so far have not resulted in any substantial reduction in $NO_x$ emissions.

Another method is directed to using an ammonia selective catalytic reactor to reduce $NO_x$ emissions. In this method, a solution of ammonia or urea contacts the exhaust stream to reduce the $NO_x$ to nitrogen, water and carbon dioxide (if urea is used). This method is disadvantageous in that toxic chemicals such as ammonia or urea have to be carried on vehicles and maintained at sufficient levels for $NO_x$ reduction.

Yet another method is the "lean NOx trap" method that involves the dispersion of metal catalysts onto substrates such as, for example, barium oxide (BaO), calcium oxide (CaO) or barium carbonate ($BaCO_3$) to form $NO_x$ traps. When, for instance, BaO is saturated with $NO_x$ thus forming barium nitrate, $Ba(NO_3)_2$, reductants are used to reduce the $Ba(NO_3)_2$ back to BaO and nitrogen. $NO_x$ emissions into the atmosphere are then reduced in this way. The cycle is then repeated. This method requires a large $NO_x$ trap often in a dual bed arrangement. For application on a locomotive or other mobile combustion sources, this method of reducing NOx would be too expensive and would take considerable space.

It is therefore desirable to have a fuel conversion system that does not require carrying toxic chemicals, and avoids the development of expensive infrastructure for the reductant distribution. This system is efficient and inexpensive for the reduction of $NO_x$ emissions.

SUMMARY

Disclosed herein is a system for reducing NOx emissions comprising a fuel tank in fluid communication with a fuel converter, wherein the fuel converter is located down stream of the fuel tank and wherein the fuel converter comprises a catalyst composition that is operative to continuously convert heavy hydrocarbon molecules having 9 or more carbon atoms per molecule into light hydrocarbon molecules having 8 or less carbon atoms per molecule; a selective catalytic reduction catalyst reactor in fluid communication with the fuel converter and located downstream of the fuel converter; and an engine in fluid communication with the fuel tank and the selective catalytic reduction catalyst reactor, wherein the engine is located downstream of the fuel tank and upstream of the selective catalytic reduction catalyst reactor.

Disclosed herein too is a method comprising converting in the presence of a catalyst composition, a heavy hydrocarbon molecule having 9 or more carbon atoms per molecule into a light hydrocarbon molecule having 8 or less carbon atoms per molecule; reacting the light hydrocarbon molecule with an exhaust stream of an engine in the presence of a selective catalytic reduction catalyst; and reducing $NO_x$ content in the exhaust stream.

DETAILED DESCRIPTION OF FIGURES

DETAILED DESCRIPTION

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Furthermore, in describing the arrangement of components in embodiments of the present disclosure, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it will be apparent to those skilled in the art that a device may be both "upstream" and "downstream" of the same device in certain configurations, e.g., a system comprising a recycle loop.

Disclosed herein is a system for the continuous reduction of $NO_x$ emissions in locomotives, stationary generators and vehicles. The system advantageously utilizes light hydrocarbons, hydrogen ($H_2$) and carbon monoxide (CO) obtained from a conversion reactor to reduce $NO_x$ emissions. The conversion reactor converts fuel, for instance diesel fuel, into light hydrocarbons with small amounts of $H_2$ and CO also present as by-products. These are mixed with the exhaust stream and facilitate a reduction of $NO_x$ emissions in the presence of a hydrocarbon based selective catalytic reduction (SCR) catalyst bed. The light hydrocarbons plus the CO and $H_2$ generated in-situ from the diesel converter will react with the $NO_x$ in the exhaust stream and reduce $NO_x$ to nitrogen at the surface of a selective catalytic reduction (SCR) thereby reducing $NO_x$ emissions from the vehicle. The system can be advantageously utilized on board in all types of vehicles that employ internal combustion engines powered by hydrocarbon-based fossil fuels or isolated units that have no access to other reductants. The system can also be advantageously utilized on board in all types of locomotives that employ engines and turbines powered by hydrocarbon-based fossil fuels. In one embodiment, the hydrocarbon-based fossil fuels are liquids. In particular, the system can be advantageously utilized in vehicles that employ diesel engines. Locomotives that employ diesel engines and diesel turbines can advantageously use the system on board for reduction of $NO_x$ emissions. The system can be also utilized in stationary combustion sources burning hydrocarbon-based fuels.

Figure 1:
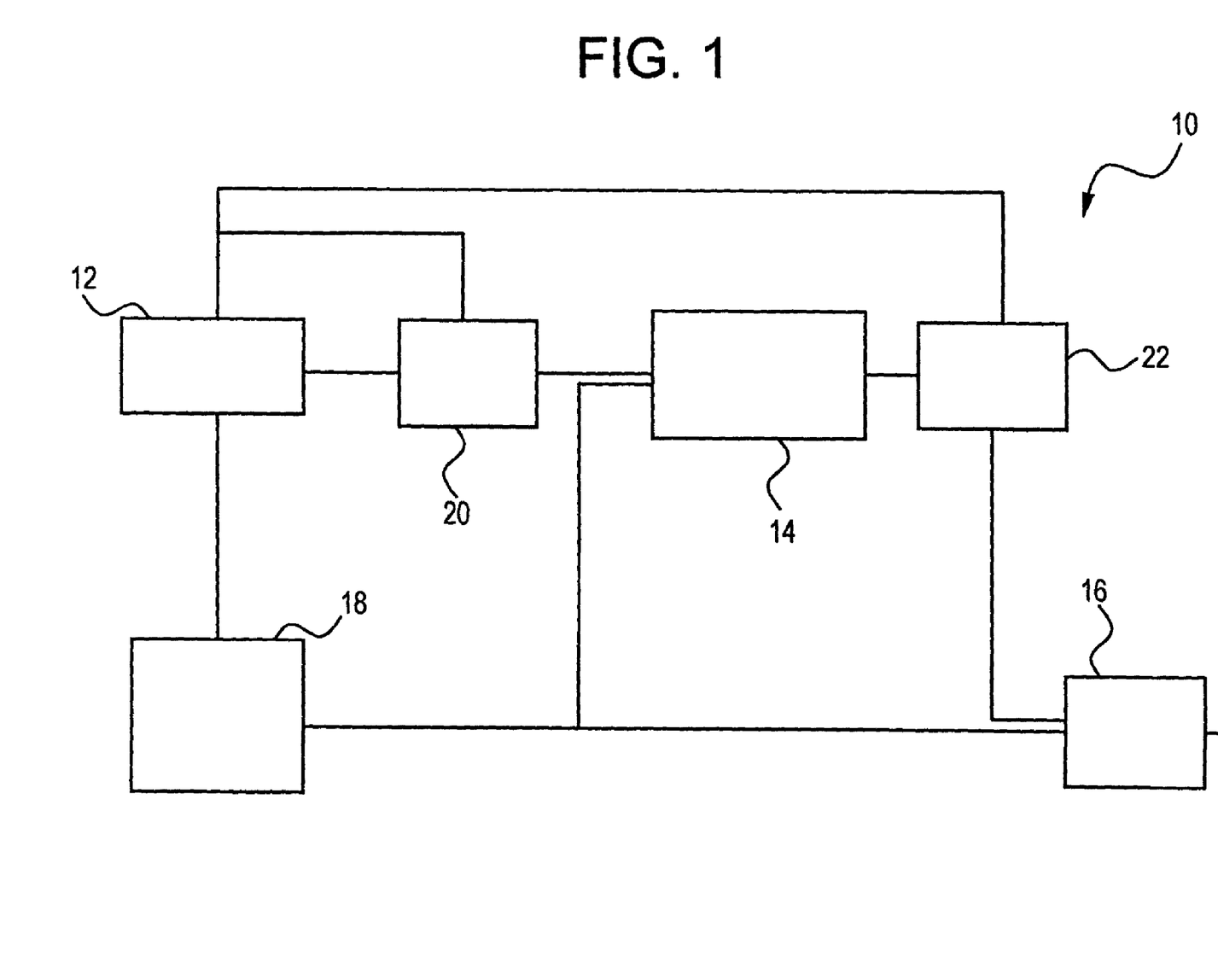
FIG. 1 is a schematic depiction of one exemplary embodiment of the system 10.

With reference now to FIG. 1, an example of system 10 for the reduction of $NO_x$ emissions comprises a fuel tank 12, a fuel converter 14, a SCR catalyst reactor 16 and an engine 18. The fuel tank 12 is upstream of the fuel converter 14 and the SCR catalyst reactor 16. The fuel tank 12, the fuel converter 14, and the SCR catalyst reactor 16 are in fluid communication with one another. The fuel converter 14 is located between the fuel tank 12 and the SCR catalyst reactor 16 and is upstream of the SCR catalyst reactor 16. The engine 18 is located downstream of the fuel tank 12 and in fluid communication with the fuel tank 12. The engine is located upstream of the fuel converter 14 and the SCR catalyst reactor 16 and is in fluid communication with both the fuel converter 14 and the SCR catalyst reactor 16.

The system 10 can also employ two optional separators—a first separator 20 and a second separator 22. The optional separators 20 and 22 comprise distillation columns (with optional vacuum systems), packed columns, membranes, condensers, centrifuges, or the like that can be used to separate aromatics from paraffins or heavy hydrocarbons from the light hydrocarbons. In one embodiment, aromatics are separated from the hydrocarbons in the separator 20, while heavy hydrocarbons are separated from the light hydrocarbons in the separator 22. The heavy hydrocarbons are recycled to the fuel tank 12 so that they can be consumed in the engine 18.

As can be seen in FIG. 1, an optional separator 20 is located down stream of the fuel tank 12 and upstream of the fuel converter 14 and is in fluid communication with the fuel tank 12 and the fuel converter 14. A feed back loop between the first separator 20 and the fuel tank 12 serves to recycle heavy hydrocarbons species to the fuel tank 12 or engine 18. The first separator comprises distillation columns with optional vacuum systems, membranes, condensers, centrifuges, or combinations thereof that can be used to separate aromatic heavy hydrocarbons from the paraffinic light hydrocarbons, and wherein the aromatics output from the first separator is recycled back to the fuel tank, and the paraffinic hydrocarbons are fed to the fuel converter.

An additional optional separator 22 can also be located between the fuel converter 14 and the SCR catalyst reactor 16. The second separator 22 is located down stream of the fuel converter 14 and upstream of the SCR catalyst reactor 16. The second separator 22 is in fluid communication with the fuel converter 14 and upstream of the SCR catalyst reactor 16. A feed back loop between the second separator 22 and the fuel tank 12 serves to recycle heavy hydrocarbons to the fuel tank 12 or engine 18. Separator 22 seeks to increase fuel efficiency and increase the robust nature of the SCR catalyst while separator 20 seeks to improve the reliability of the fuel converter and increase fuel efficiency. As noted above, the separators are optional. However, in one embodiment, either the first separator 20 or the second separator 22 can be used in the system. In yet another embodiment, both the first separator 20 and the second separator 22 can be used in the system. It is generally desirable to use the second separator due to its low cost and low fuel consumption. Additionally, the second separator 22 introduces more robustness to the system of producing a rich-stream in useful reductants to the SCR system.

In an exemplary embodiment, the second separator 22 can be a simple packed column e.g., a vessel with some packing material such as pall rings packed inside a column with either some coils or a jacket where cooling water at a temperature of about 70 to about 99° C. available on the locomotive will flow through and maintain the column temperature at about 100 to about 200° C. In another embodiment, a cooled knock-out plate or a condenser operating at a temperature of about 90 to about 150° C. with heated return lines can be used to return the heavy hydrocarbons to the fuel tank 12 or engine 18. This facilitates uniform viscosity and flow characteristics for the heavy hydrocarbons that are returned to the fuel tank 12 or the engine 18.

The term "fluid communication" encompasses the containment and/or transfer of compressible and/or incompressible fluids between two or more points in the system 10. Examples of suitable fluids are gases, liquids, combinations of gases and liquids, or the like. The use of pressure transducers, thermocouples, flow, hydrocarbon, $NO_x$ sensors aid in communication and control. In one embodiment, computers can be used to aid in the flow of fluids in the system. The term "on-board" refers to the ability of a vehicle or locomotive to host the system 10 in its entirety aboard the vehicle or locomotive.

A variety of fuels may be stored in the fuel tank 12 and used in the system 10. In one embodiment, the fuel is a hydrocarbon-based fossil fuel. It is desirable for the hydrocarbon-based fossil fuel to be a liquid. Examples of suitable liquids are diesel, gasoline, jet-fuel, logistic fuel (JP-8), kerosene, fuel oil, bio-diesel, or the like, or a combination comprising at least one of the foregoing hydrocarbon-based fossil fuels. As will be discussed in further detail below, the fuel converter 14 converts heavy hydrocarbons to light hydrocarbons which are then used to reduce $NO_x$ in the exhaust. Heavy hydrocarbons are hydrocarbons that have 9 or more carbon atoms. In an exemplary embodiment, an exemplary heavy hydrocarbon is diesel. Light hydrocarbons are those that have 8 or less carbon atoms. Exemplary light hydrocarbons are those having about 2 to about 8 hydrocarbons. Light hydrocarbons are also termed paraffinic hydrocarbons. Paraffinic hydrocarbons can be saturated or unsaturated.

The fuel converter 14 comprises a fixed bed reactor that comprises a catalyst composition. It is desirable for the catalyst composition to be able to operate under conditions that vary from oxidizing at the inlet of the reactor to reducing conditions at the exit of the reactor. The catalyst should be capable of operating effectively and without any thermal degradation from a temperature of about 200 to about 900° C. The catalyst should operate effectively in the presence of air, carbon monoxide, carbon dioxide, water, alkanes, alkenes, cyclic and linear compounds, aromatic hydrocarbons and sulfur-containing compounds. The catalyst composition should provide for low levels of coking such as by preferentially catalyzing the reaction of carbon with water to form carbon monoxide and hydrogen thereby permitting the formation of only a low level of carbon on the surface of the catalyst. The catalyst composition should be able to resist poisoning from such common poisons such as sulfur and halogen compounds. Moreover, an exemplary catalyst composition may satisfy all of the foregoing requirements simultaneously.

The catalyst composition is bifunctional, i.e., it performs a cracking function and a catalytic partial oxidation function. The cracking function involves the breaking of hydrocarbon-based fossil fuel molecules (e.g., diesel) into shorter molecules to extract low-boiling fractions such as gasoline. An exemplary cracking function involves the breaking of heavy hydrocarbon molecules having nine or more carbon atoms to light hydrocarbon molecules having eight or less carbon atoms.

The catalytic partial oxidation function involves the oxidation of coke or hydrocarbons into carbon monoxide and hydrogen. The catalyst composition generally comprises sites that perform the catalytic partial oxidation function (catalytic partial oxidation sites) located adjacent to sites that perform the cracking function (cracking sites).

In one embodiment, the catalyst composition contained in the fuel converter 14 is bifunctional, i.e., it serves to crack heavier hydrocarbons to light hydrocarbons, while simultaneously preventing poisoning of the catalyst composition from coke depositions. Coke build-up that occurs during the cracking of hydrocarbons while using traditional zeolite cracking catalysts during processes such as fluidized catalytic cracking (FCC) deactivates the catalyst. The bifunctional catalyst advantageously slows down coke build-up rate on the surface of cracking catalysts, thus allowing it to continue being active for cracking hydrocarbons, which would normally not occur on conventional cracking catalysts operating under similar conditions.

In the catalyst composition, since the catalytic partial oxidation reaction is an exothermic reaction, while cracking is an endothermic reaction, the heat generated at a catalytic partial oxidation site facilitates the endothermic cracking reaction and also facilitates the oxidation of coke. In one embodiment, the catalytic partial oxidation sites are used to oxidize the coke away from the cracking sites to keep the cracking sites clean and active.

The use of a fuel converter 14 that employs the catalytic composition is advantageous in that it may use only a single fixed bed reactor to convert diesel fuel to a mixture of light hydrocarbons and syngas. Syngas comprises hydrogen and carbon monoxide. This mixture of light hydrocarbons and syngas can be used as a reducing agent for $NO_x$ reduction in diesel engine exhaust and will be discussed later. If desired, the fuel converter 14 can employ more than one fixed bed reactor to improve productivity. For example, the catalytic converter can employ about 2 to about 6 fixed bed reactors if desired.

The catalytic partial oxidation sites generally comprise noble metals that perform the catalytic partial oxidation function. The catalytic partial oxidation sites comprise one or more "platinum group" metal components. As used herein, the term "platinum group" metal implies the use of platinum, palladium, rhodium, iridium, osmium, ruthenium or mixtures thereof. Exemplary platinum group metal components are rhodium, platinum and optionally, iridium. The catalyst composition generally comprises about 0.1 to about 20 wt % of the platinum group metal. The platinum group metal components may optionally be supplemented with one or more base metals, particularly base metals of Group III, Group IB, Group VB and Group VIB of the Periodic Table of Elements. Exemplary base metals are iron, cobalt, nickel, copper, vanadium and chromium.

The cracking sites generally comprise a zeolite. The zeolites generally have a silica-to-alumina mole ratio of at least about 12. In one embodiment, a zeolite having a silica-to-alumina mole ratio of about 12 to about 1000 is used. In one embodiment, a zeolite having a silica-to-alumina mole ratio of about 15 to about 500 is used. Examples of suitable zeolites are RE-Y (rare earth substituted yttria), USY (ultrastable yttria zeolite), RE-USY ZSM-5, ZSM-11, ZSM-12, ZSM-35, zeolite beta, MCM-22, MCM-36, MCM-41, MCM-48, or the like, or a combination comprising at least one of the foregoing zeolites.

Zeolites also contemplated for use in this process are the crystalline silicoaluminophosphates (SAPO). Examples of suitable silicoalumino-phosphates include SAPO-11, SAPO-34, SAPO-31, SAPO-5, SAPO-18, or the like, or a combination comprising at least one of the foregoing silicoaluminophosphates.

The platinum group catalysts along with other base metal catalysts are washcoated onto the molecular sieves to form the catalytic composition. In one embodiment, the catalytic partial oxidation sites comprise about 0.1 to about 5.0 weight percent (wt %) of the total weight of the catalytic composition. In a preferred embodiment, the catalytic partial oxidation sites comprise about 0.3 to about 1.0 wt % of the total weight of the catalytic composition.

In an exemplary embodiment, in one method of operating the fuel converter 14, a gas-assisted nozzle is utilized to atomize the fuel at a low-pressure inlet into the fuel converter 14 (not shown). The fuel, which primarily comprises heavy hydrocarbons undergoes cracking to form light hydrocarbons. The light hydrocarbons are then used to reduce the $NO_x$ emitted in the engine exhaust. The reduction of the $NO_x$ with the light hydrocarbons occurs in the presence of a SCR catalyst as will be detailed later.

A portion of the hot exhaust gas that is emitted by the locomotive engine can be used as a secondary gas for atomizing the fuel. Air can also be employed as the secondary gas for atomizing the fuel. In an exemplary embodiment, a portion of the exhaust stream is combined with air to form the secondary gas to facilitate the catalytic partial oxidation reaction. The amount of hot engine exhaust gas is effective to light off the catalytic partial oxidation reaction in the fuel converter 14. The heat released from the exothermic catalytic partial oxidation reaction will drive the endothermic cracking reaction forward. Water present in the exhaust stream can facilitate the reduction of coke formation on the catalyst.

In one embodiment, in order to light off the catalytic partial oxidation reaction, the oxygen/carbon ($O_2/C$) mole ratio in the feed gas that is supplied to the fuel converter is in an amount of about 0.01 to about 0.5. In another embodiment, the oxygen/carbon ($O_2/C$) mole ratio in the feed gas is in an amount of about 0.05 to about 0.4. In yet another embodiment, the oxygen/carbon ($O_2/C$) mole ratio in the feed gas is in an amount of about 0.1 to about 0.3. An exemplary ($O_2/C$) mole ratio in the feed gas is in an amount of about 0.1.

The temperature of the fuel converter is maintained at about 550° C. to about 650° C., during the conversion of heavy hydrocarbons to light hydrocarbons. In one embodiment, the temperature of the fuel converter is maintained at about 580° C. to about 640° C., during the conversion of heavy hydrocarbons to light hydrocarbons. An exemplary temperature is about 600 to about 620° C. At about 600 to about 620° C., the deposition of sulfate groups derived from sulfur containing organic compounds will be reduced and hence the sulfur tolerance of the system 10 is enhanced.

If coke species accumulate on the catalyst composition in the fuel converter during the catalytic partial oxidation process, the flow rate of engine exhaust gas (which contains considerable quantity of oxygen and water) can be periodically increased to burn and steam the coke off and to regenerate the hybrid catalyst activity. A single valve (not shown) can also periodically be used to increase the flow rate of engine exhaust gas and/or air to burn the coke off.

In one embodiment, in order to burn off coke that is deposited on the catalytic composition, the $O_2/C$ mole ratio in the feed gas to the diesel converter can be varied in an amount of about 0.1 to about 0.95. In one embodiment, in order to burn off coke that is deposited on the catalytic composition, the $O_2/C$ mole ratio in the feed gas to the diesel converter can be varied in an amount of about 0.2 to about 0.85. An exemplary $O_2/C$ mole ratio in the feed gas to the diesel converter is about 0.8.

The temperature of the fuel converter is maintained at about 550° C. to about 750° C., during the burning off coke that is deposited on the catalytic composition. In one embodiment, the temperature of the fuel converter is maintained at about 600° C. to about 720° C., during the burning off coke that is deposited on the catalytic composition. In another embodiment, the temperature of the fuel converter is maintained at about 620° C. to about 710° C., during the burning off coke that is deposited on the catalytic composition. An exemplary temperature is about 650 to about 700° C. during the burning off coke that is deposited on the catalytic composition.

The use of the catalytic composition in conjunction with an increased exhaust gas and/or air flow to burn off the coke is advantageous in that it overcomes the need for a system comprising two reactors to perform the cracking and regeneration functions. Noble metals such as rhodium, iridium and platinum are also oxidation catalysts, and they will also help to burn the coke more efficiently off the zeolite cracking catalyst. The noble metal promotes oxidation of coke into carbon dioxide and minimizes or completely avoids formation of carbon monoxide during the coke oxidation process.

Figure 2:
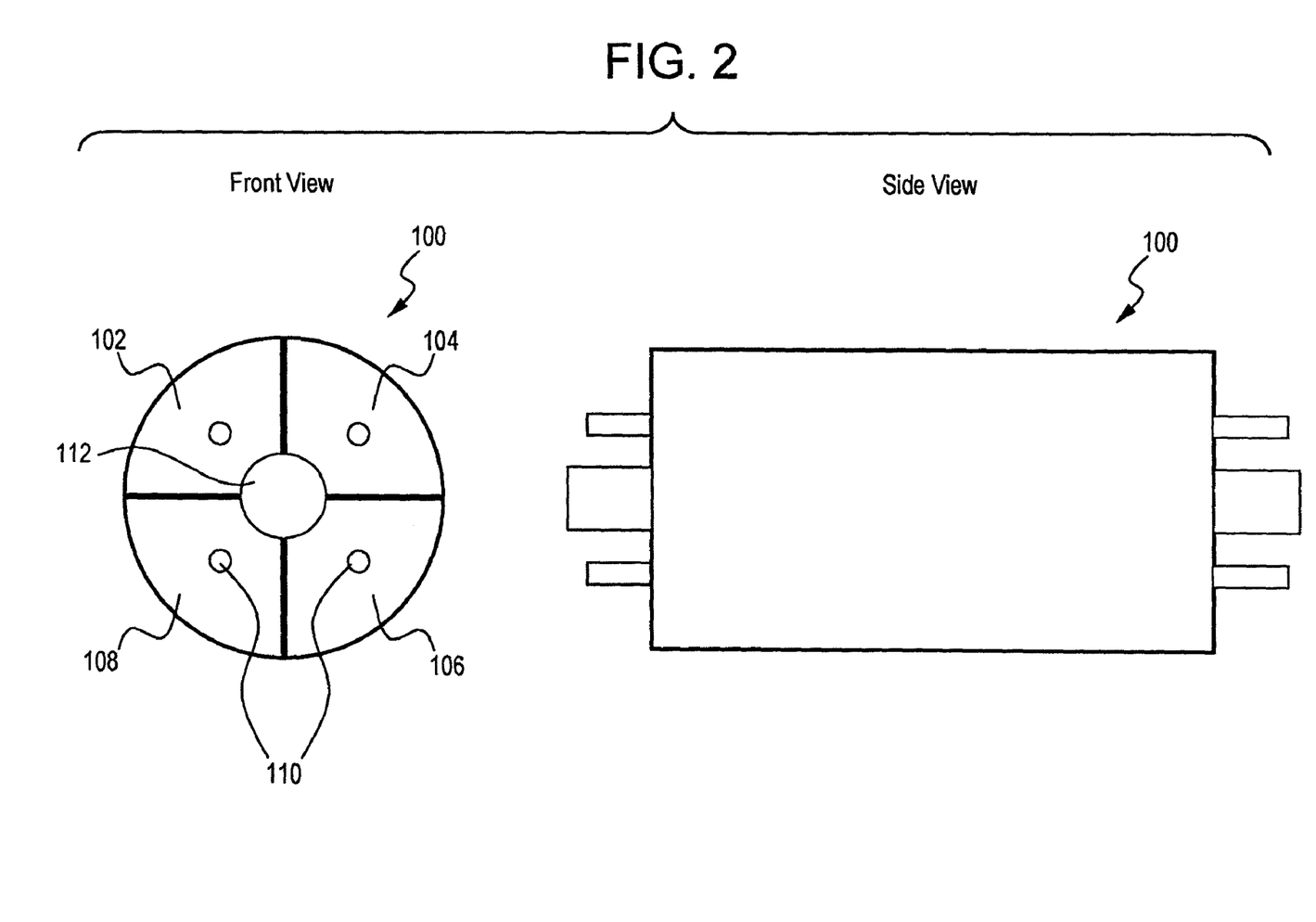
FIG. 2 is a schematic depiction of one exemplary embodiment of a rotary fuel converter.

In another embodiment, in another method of operating the fuel converter 14, the fuel converter 14 can comprise a rotary reactor, wherein the inlet port of such a reactor can be periodically rotated through a first small angle. FIG. 2 is an exemplary embodiment or a rotary reactor 100 that can be used as a fuel converter. The rotary reactor 100 comprises 4 reaction chambers 102, 104, 106, and 108 each of which contains the catalyst composition. Each reaction chamber also comprises an inlet port 110 that is used to permit feed gases into the reactor. The chambers and the inlet ports can be rotated about a shaft 112.

The rotation of the inlet port can be conducted automatically via a computer. By rotating the inlet port of the reactor, a small portion of the reactor can be subjected to the high temperature exhaust gases. The coke disposed upon the catalyst composition contained in this small portion of the reactor is oxidized by the hot exhaust gases and removed. Thus a small portion of the catalyst composition is completely regenerated, and the inlet port can be rotated through a second small angle in order to regenerate another portion of the catalyst. The rotation can be continued throughout the process to continuously convert heavy hydrocarbons to light hydrocarbons and syngas without significant catalyst deactivation due to coking. As noted above, syngas comprises hydrogen and carbon monoxide, both of which are useful reducing agents when exhaust gases having a low temperature are used. The use of the continuously operating fuel converter 14 permits it to be used on-board in vehicles and locomotives.

The light hydrocarbons obtained from the fuel converter 14 are then permitted to flow to the SCR catalyst reactor 16, where they are used to reduce the $NO_x$ in the engine exhaust stream. The reduction of $NO_x$ occurs over a selective catalytic reduction catalyst. Examples of suitable selective catalytic reduction catalysts are metals such as silver, gallium, cobalt, molybdenum, tungsten, indium, bismuth, vanadium or a combination comprising at least one of the foregoing metals in a binary, ternary or quaternary mixture disposed upon a suitable support. Oxides of metals can be used as catalysts if desired. Oxides of metals can also be used as catalyst supports. Examples of suitable metal oxide supports are alumina, titania, zirconia, ceria, silicon carbide, or a combination comprising at least one of the foregoing supports.

The light hydrocarbons can be used to reduce $NO_x$ in the exhaust stream, according to the following overall reaction (1).

$$NO_x + O_2 + \text{organic reductant} \rightarrow N_2 + CO_2 + H_2O \quad (1)$$

The exhaust stream usually comprises air, water, CO, $CO_2$, $NO_x$, $SO_x$, $H_2O$ and may also comprise other impurities. Water contained in the exhaust stream is generally in the form of steam. Additionally, uncombusted or incompletely combusted fuel may also be present in the exhaust stream. The light hydrocarbon molecules comprising less than or equal to about 8 carbon atoms along with CO and $H_2$ is fed into the exhaust stream to form a gas mixture, which is then fed through the selective catalytic reduction catalyst. Sufficient oxygen to support the $NO_x$ reduction reaction may already be present in the exhaust stream. If the oxygen present in the exhaust stream is not sufficient for the $NO_x$ reduction reaction, additional oxygen gas may also be introduced into the exhaust stream in the form of air. In some embodiments the gas mixture comprises from about 1 mole percent (mole %) to about 21 mole % of oxygen gas. In some other embodiments the gas mixture comprises from about 1 mole % to about 15 mole % of oxygen gas.

The $NO_x$ reduction reaction may take place over a range of temperatures. In one embodiment, the reduction reaction can occur at a temperature of about 200° C. to about 600° C. In another embodiment, the reduction reaction can occur at a temperature of about 300° C. to about 500° C. In yet another embodiment, the reduction reaction can occur at a temperature of about 350° C. to about 450° C.

If syngas is produced during the conversion of heavy hydrocarbons to light hydrocarbons in the fuel converter 14, then reduction of $NO_x$ in the SCR catalyst reactor 16 with the light hydrocarbons and syngas can take place at temperatures of as low as about 150° C., according to the following reaction (2).

$$NO_x + H_2 + CO + \text{organic reductant} \rightarrow N_2 + H_2O + CO_2 \quad (2)$$

In one embodiment, reaction (2) occurs at a temperature of about 100 to about 500° C. In another embodiment, the reaction occurs at a temperature of about 150 to about 350° C. The system 10 detailed above provides many advantages that make it useful in diesel locomotives. In one embodiment, the catalyst composition advantageously displays a cracking function as well as a catalytic partial oxidation function. This reduces the need for a system having two reactors with multiple hot valves, which alternately switches between cracking and regeneration modes thereby reducing costs.

Additionally, the use of a simple air-valve to periodically increase the flow rate of engine exhaust gas and/or air to burn the coke off, also reduces the need for a system having two or more reactors. The use of the gas-assisted nozzle facilitates the atomization of the heavy hydrocarbons such as diesel at a low pressure. In one embodiment, the fuel pressure is less than or equal to about 8 bar (8.15 kg/cm$^2$) and the air pressure is less than or equal to about 6.5 bar (6.62 kg/cm$^2$) prior to entry into the fuel converter 14. In one embodiment, the fuel pressure is less than or equal to about 6 kg/cm$^2$ and the air pressure is less than or equal to about 4.5 bar kg/cm$^2$ prior to entry into the fuel converter 14. In yet another embodiment, the fuel pressure is less than or equal to about 4.5 kg/cm$^2$ and the air pressure is less than or equal to about 3.5 bar kg/cm$^2$ prior to entry into the fuel converter 14.

In addition, the use of a fuel converter 14 that can rotate (i.e., functions as a rotary reactor) permits regeneration of the entire catalyst bed thereby permitting continuous operation. This allows for an effective on-board utility while reducing operating and maintenance costs.

The system 10 advantageously uses hot exhaust gases from the exhaust stream to light off the catalytic partial oxidation function of the catalyst composition. This permits integration of the system 10 with the exhaust system to improve the efficiency of the fuel converter 14. The use of hot exhaust gases advantageously facilitates the production of syngas, which can be used to reduce the $NO_x$ concentration at lower temperatures. In addition, the hydrogen contained in the syngas minimizes coke formation.

Should it be desirable to facilitate a deep regeneration of the fuel conversion catalyst and $NO_x$ SCR catalyst, this could be accomplished by coupling a vigorous regeneration process to the engine output and the subsequent exhaust generated. Within the engine work cycle there are work loads where the heat is maximized while the $NO_x$ is minimized. These make useful points in the process for the regeneration of catalysts with minimal usage of additional energy.

The following examples, which are meant to be exemplary, not limiting, illustrate compositions and methods of manufacturing of some of the various embodiments of the catalytic compositions described herein. The following examples, which are meant to be exemplary, not limiting, illustrate the process for using a system that facilitates the reduction of $NO_x$ emissions described herein.

EXAMPLE

This example was undertaken to demonstrate the effectiveness of several catalyst compositions that display a cracking function as well as a catalytic partial oxidation function. The zeolite is modified by wash-coating a partial oxidation element (rhodium) onto the surface of the zeolite. The zeolite, which serves as the cracking catalyst, is a FCC type of catalyst. The rhodium was wash-coated in an amount of 5 wt %, based on the total weight of the catalyst (weight of the zeolite and the weight of the rhodium). The catalyst was added to a fixed bed reactor.

A comparative catalyst consisting only of the cracking catalyst with no rhodium (partial oxidation catalyst) was also tested. The catalysts were contained in a fixed bed reactor. Diesel fuel was fed to the catalysts to determine performance. The respective catalysts were tested with an air co-feed and without an air-cofeed. The combination of the diesel fuel and the air co-feed had a molar ratio of oxygen to carbon in an amount of 0.04 to about 0.1. In the 4 hour run example (graphically depicted in the FIG. 3), the molar ratio of oxygen to carbon ($O_2$/C) was increased for the first 30 minutes (at intervals of about 6 min each) from about 0.04 to about 0.11. This was done to prevent the temperature of the catalyst from increasing to about 650° C., thereby producing too much initial coke on the catalyst composition. After 30 minutes, the $O_2$/C molar ratio was maintained at 0.11.

Figure 3:
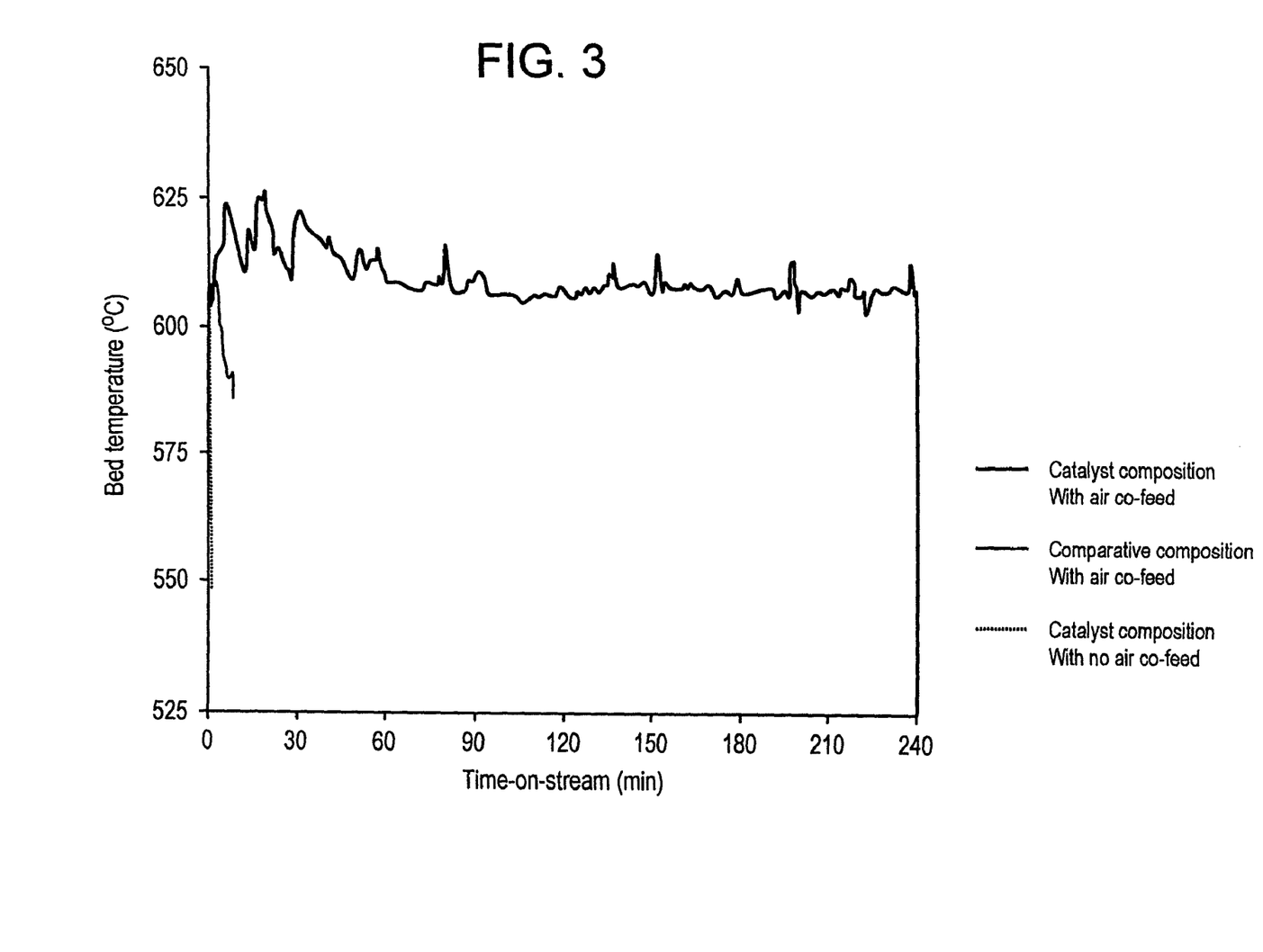
FIG. 3 is a graphical representation of the performance of the catalyst composition as well as a comparative catalyst, when both are treated with diesel in a fuel converter at elevated temperature compositions.

The results are shown in the FIG. 3. FIG. 3 is a graphical representation of the performance of the catalyst composition as well as a comparative catalyst, when both are subjected to diesel in a fuel converter at elevated temperatures. As may be seen in the FIG. 3, an air co-feed along with diesel was supplied to the catalyst composition or to the comparative catalyst. In one of the tests depicted in the FIG. 3, no air co-feed was used during the testing of the catalyst composition. From the FIG. 3, it may be seen that upon feeding only diesel fuel (no air co-feed) to a fixed bed reactor containing the catalyst composition at a temperature of about 600 to about 635° C., catalytic cracking occurs immediately and temperature of the bed drops sharply reaching 550° C. in less than 1 minute. This result is due to the endothermic nature of hydrocarbon cracking. The rapid temperature drop indicates that the activity of the catalyst composition goes to near negligible levels. This is believed to be due to the low temperature as well as because of the blockage of acid sites by the coke formed.

When the comparative catalyst consisting of only the cracking catalyst is tested using an air co-feed along with diesel, the temperature drop is not as steep as when no air co-feed is used. However, the drop in temperature indicates that the reaction cannot be sustained at low levels of the air co-feed when only a cracking catalyst is used. When an air co-feed is used with the catalyst composition comprising the cracking catalyst as well as the partial oxidation catalyst, the temperature drop is significantly reduced as shown in the FIG. 3.

Thus by co-feeding air with diesel fuel to the catalyst composition, the extent of reaction activity can be significantly increased. These results also demonstrate that the combination of a cracking catalyst with a partial oxidation catalyst can be advantageously used to crack heavier hydrocarbons to light hydrocarbons, while simultaneously preventing poisoning of the catalyst composition from coke depositions. Coke build-up that occurs during the cracking of hydrocarbons while using traditional zeolite cracking catalysts is therefore reduced by the use of the catalyst composition. The bifunctional catalyst advantageously slows down coke build-up rate on the surface of cracking catalysts, thus allowing it to continue being active for cracking hydrocarbons, which would normally not occur on conventional cracking catalysts operating under similar conditions.

Without being limited to theory, rhodium lights-off partial oxidation of a very small portion of the hydrocarbon feed (i.e., the diesel), which is just enough to supply the amount of energy required to sustain the endothermic catalytic cracking. As may be seen in the FIG. 3, the reaction sustains itself for several hours. Coke is formed at a much smaller rate than conventional catalytic cracking without air co-feed. Thus catalytic activity can be advantageously maintained for several hours before regeneration of the catalyst is conducted.

In one embodiment, the catalyst composition can be advantageously continuously used for a time period of greater than or equal to about 50 hours. In another embodiment, the catalyst composition can be advantageously continuously used for a time period of greater than or equal to about 100 hours. In yet another embodiment, the catalyst composition can be advantageously continuously used for a time period of greater than or equal to about 500 hours. In yet another embodiment, the catalyst composition can be advantageously continuously used for a time period of greater than or equal to about 1,000 hours.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

The invention claimed is:

1. A system for reducing $NO_x$ emissions comprising:
a fuel tank in fluid communication with a fuel converter, wherein the fuel converter is located down stream of the fuel tank and wherein the fuel converter comprises a catalyst composition that is operative to continuously convert heavy hydrocarbon molecules having 9 or more carbon atoms per molecule into light hydrocarbon molecules having 8 or less carbon atoms per molecule;
a selective catalytic reduction catalyst reactor in fluid communication with the fuel converter and located downstream of the fuel converter, wherein the reactor is configured to receive the light hydrocarbon molecules from the fuel converter; and
an engine in fluid communication with the fuel tank and the selective catalytic reduction catalyst reactor, wherein the engine is located downstream of the fuel tank and upstream of the selective catalytic reduction catalyst reactor; and wherein the catalyst composition comprises sites that perform a cracking function and sites that perform a catalytic partial oxidation function, wherein the cracking function enables the conversion of the heavy hydrocarbon molecules to light hydrocarbon molecules; and wherein the catalytic partial oxidation function enables oxidation of a hydrocarbon based fossil fuel and coke that is deposited on the catalyst composition.

2. The system of claim 1, wherein the engine is an internal combustion engine, a turbine, a power plant that burns liquid fuels.

3. The system of claim 1, wherein exhaust gas from the engine is fed to the selective catalytic reduction catalyst reactor.

4. The system of claim 1, wherein exhaust gas from the engine is fed to the fuel converter.

5. The system of claim 1, further comprising a first separator located downstream of the fuel tank and upstream of the fuel converter.

6. The system of claim 5, wherein the first separator comprises membranes that separate aromatic hydrocarbons from paraffinic hydrocarbons, and wherein the separated aromatic hydrocarbons are recycled back to a fuel tank, while the separated paraffinic hydrocarbons are fed to a fuel converter.

7. The system of claim 1, further comprising a second separator located downstream of the fuel converter and upstream of the selective catalytic reduction catalyst reactor.

8. The system of claim 7, wherein the second separator comprises distillation columns with optional vacuum systems, membranes, condensers, or combinations thereof that are used to separate heavy hydrocarbons from the light hydrocarbons and wherein the heavy hydrocarbons from the second separator are recycled to a fuel tank or to the engine, while the light hydrocarbons are fed to a selective catalytic reduction catalyst reactor.

9. The system of claim 7, wherein the second separator comprises a simple packed column.

10. The system of claim 1, further comprising a first separator and a second separator, wherein the first separator comprises a membrane for effecting separation and the second separator comprises a condenser for effecting separation.

11. The system of claim 1, wherein the catalyst composition comprises a platinum group metal disposed upon a molecular sieve.

12. The system of claim 11, wherein the platinum group metal comprises platinum, palladium, rhodium, iridium, osmium, ruthenium or mixtures thereof.

13. The system of claim 11, wherein the catalyst composition comprises about 0.1 to about 20 weight percent of the platinum group metal.

14. The system of claim 11, wherein the platinum group metal further comprises one or more base metals from Group VIII, Group IB, Group VB or Group VIB of the Periodic Table of Elements.

15. The system of claim 1, wherein the catalyst composition comprises a zeolite cracking catalyst.

16. The system of claim 15, wherein the zeolite cracking catalyst comprises an aluminophosphate, a silicoaluminophosphate, or a combination comprising at least one of the foregoing zeolites.

17. The system of claim 15, wherein the zeolite cracking catalyst comprises rare earth substituted yttria), ultrastable yttria zeolite, rare earth ultrastable substituted yttria, zeolite beta, ZSM-5, ZSM-11, ZSM-12, ZSM-35, MCM-22, MCM-36, MCM-41, MCM-48, or a combination comprising at least one of the foregoing zeolites.

18. The system of claim 1, wherein the fuel tank comprises diesel, kerosene, biodiesel, gasoline, jet fuel, logistic fuel and fuel oil.

19. The system of claim 1, wherein the fuel converter is rotated during the process of conversion of heavy hydrocarbon molecules into light hydrocarbon molecules.

20. An article employing the system of claim 1.

21. A vehicle or stationary generator employing the system of claim 1.

22. A locomotive employing the system of claim 1 on board.

* * * * *

UNITED STATES PATENT AND TRADEMARK OFFICE
CERTIFICATE OF CORRECTION

| | |
|---|---|
| PATENT NO. | : 7,879,295 B2 |
| APPLICATION NO. | : 11/172288 |
| DATED | : February 1, 2011 |
| INVENTOR(S) | : Liu et al. |

It is certified that error appears in the above-identified patent and that said Letters Patent is hereby corrected as shown below:

In Column 5, Line 42, delete "Group III," and insert -- Group VIII, --, therefor.

In Column 12, Line 25, in Claim 17, delete "yttria)," and insert -- yttria, --, therefor.

Signed and Sealed this
Third Day of May, 2011

David J. Kappos
*Director of the United States Patent and Trademark Office*